United States Patent
Poss et al.

(10) Patent No.: US 7,386,448 B1
(45) Date of Patent: Jun. 10, 2008

(54) BIOMETRIC VOICE AUTHENTICATION

(75) Inventors: John C. Poss, New Braunfels, TX (US); Dag Boye, Euless, TX (US); Mark W. Mobley, The Colony, TX (US)

(73) Assignee: T-Netix, Inc., Dallas, TX (US)

( * ) Notice: Subject to any disclaimer, the term of this patent is extended or adjusted under 35 U.S.C. 154(b) by 664 days.

(21) Appl. No.: 10/877,330

(22) Filed: Jun. 24, 2004
(Under 37 CFR 1.47)

(51) Int. Cl.
*G10L 17/00* (2006.01)

(52) U.S. Cl. .................. 704/247; 704/246; 704/270; 379/88.02; 379/188

(58) Field of Classification Search ............ 704/246, 704/247, 270; 379/88.02, 188
See application file for complete search history.

(56) References Cited

U.S. PATENT DOCUMENTS

| | | | |
|---|---|---|---|
| 5,033,088 A | 7/1991 | Shipman | |
| 5,297,194 A | 3/1994 | Hunt et al. | |
| 5,634,087 A | 5/1997 | Mammone et al. | |
| 5,657,424 A | 8/1997 | Farrell et al. | |
| 5,839,103 A | 11/1998 | Mammone et al. | |
| 5,893,902 A | 4/1999 | Transue et al. | |
| 6,047,053 A | 4/2000 | Miner et al. | |
| 6,205,424 B1* | 3/2001 | Goldenthal et al. | 704/247 |
| 6,219,639 B1* | 4/2001 | Bakis et al. | 704/246 |
| 6,356,868 B1 | 3/2002 | Yuschik et al. | |
| 6,424,946 B1* | 7/2002 | Tritschler et al. | 704/272 |
| 6,519,561 B1 | 2/2003 | Farrell et al. | |
| 6,529,871 B1 | 3/2003 | Kanevsky et al. | |
| RE38,101 E | 4/2003 | Vysotsky et al. | |
| 6,560,323 B2 | 5/2003 | Gainsboro | |
| 6,629,073 B1* | 9/2003 | Hon et al. | 704/256.4 |
| 6,871,287 B1* | 3/2005 | Ellingson | 726/9 |
| 2002/0174348 A1* | 11/2002 | Ting | 713/186 |
| 2003/0161503 A1 | 8/2003 | Kramer | |
| 2004/0236573 A1* | 11/2004 | Sapeluk | 704/224 |

FOREIGN PATENT DOCUMENTS

| | | |
|---|---|---|
| EP | 1172771 A1 | 1/2002 |
| EP | 1172770 B1 | 9/2004 |
| WO | WO 02/07107 A2 | 1/2002 |

OTHER PUBLICATIONS

Lee, Kai-Fu, et al., "Large-Vocabulary Speaker-Independent Continuous Speech Recognition Using HMM", Proceedings: International Conference on Acoustics, Speech, and Signal Processing (ICASSP), Apr. 11-14, 1988, New York, NY, pp. 123-126.
Bahl, Lalit R., et al., "A Maximum Likelihood Approach to Continuous Speech Recognition", Readings in Speech Recognition, 1983, pp. 308-319.

* cited by examiner

*Primary Examiner*—Vijay Chawan
(74) *Attorney, Agent, or Firm*—Fenwick & West LLP

(57) ABSTRACT

A system and method enrolls a speaker with an enrollment utterance and authenticates a user with a biometric analysis of an authentication utterance, without the need for a PIN (Personal Identification Number). During authentication, the system uses the same authentication utterance to identify who a speaker claims to be with speaker recognition, and verify whether is the speaker is actually the claimed person. Thus, it is not necessary for the speaker to identify biometric data using a PIN. The biometric analysis includes a neural tree network to determine unique aspects of the authentication utterances for comparison to the enrollment authentication. The biometric analysis leverages a statistical analysis using Hidden Markov Models to before authorizing the speaker.

35 Claims, 6 Drawing Sheets

BIOMETRIC VOICE AUTHENTICATION

BACKGROUND OF THE INVENTION

1. Field of the Invention

This invention relates generally to a computerized voice authentication system, and more particularly, to using biometrics in a system that both identifies and verifies a speaker.

2. Description of Related Art

Generally, biometrics refer to a person's unique physical attributes such as voice, eyes, and fingerprints. Thus, biometric verification provides a powerful new paradigm for user-friendly, albeit reliable, security. In fact, biometric verification can be more reliable than PIN (Personal Identification Number)-based systems, which can verify who a person claims to be, but not whether the person actually is the claimed person. By way of an example, an alphanumeric PIN presented to an ATM machine can verify that the person claims to be the account holder having the PIN. But without biometric verification (or human intervention), the ATM machine cannot verify that the person actually is the account holder. This limitation poses problems in the case of identity thefts and other breaches and in the case where it is inconvenient to enter a PIN.

Humans perform biometric analysis using inherent senses such as sight and sound to discriminate between people based on physical attributes. Computers use biometric verification uses voice print matching, iris and retina scans, facial scans, and the like to verify a person's identity. However, implementing biometric analysis within computerized systems has been limited by expense, processing power, and amount data needed to represent physical attributes.

One problem with computer-implemented biometric verifications is identifying who is to be verified. In other words, a computer can compare two voices, such as a test voice against a training voice, in order to verify a match, but cannot effectively select the training voice from a large database of stored training voices. Thus, current techniques require a two-step process in which a person must first identify who they claim to be before being verified.

Accordingly, there is a need for a robust biometric authentication system and method for identifying and verifying a person with biometric analysis. Moreover, the solution should present a one-step process to a user by using a common voice sample for both identification and verification.

SUMMARY OF THE INVENTION

The present invention meets these needs by providing a system and method for biometric authentication. In one embodiment, the system enrolls a speaker with an enrollment utterance and authenticates the speaker with a biometric analysis of a single authentication utterance. The system uses the single utterance for both identification and verification, thereby reducing user complexity. Accordingly, the utterance can be used first to identify who a speaker claims to be, and second, to verify that the speaker is the claimed person using a biometric voice analysis. Advantageously, the authentication benefits from text-dependent biometric verification without requiring a PIN to separately identify the speaker.

In another embodiment, an identification module in the system translates the enrollment utterance to, for example, a text password for indexing a speaker's enrollment voice print. During authentication, the identification module translates and matches an authentication utterance with the stored password to identify the speaker.

In one embodiment, a verification module in the system uses the identification to retrieve the speaker's enrollment voice print. The verification module performs biometric voice analysis to compare the enrollment utterance with the authentication utterance. For example, the verification module uses the neural tree network to identify unique aspects of the authentication utterance to verify whether the received identification matches the enrollment voice print.

In still another embodiment, the verification module also uses statistical analysis, such as Hidden Markov Models, to determine the likelihood that an identification associated with the authentication utterance is the same as an identification associated with the enrollment utterance. The verification module can determine a score based on all analyses and send an authorization if the score surpasses a threshold.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instruction purposes, and may not have been selected to delineate of circumscribe the inventive subject mater, resort to the claims being necessary to determine such inventive subject matter.

DETAILED DESCRIPTION OF THE PREFERRED EMBODIMENTS

The present invention relates to a system and method for voice authentication. In one embodiment of the present invention, the system first enrolls speakers with an enrollment utterance, and subsequently authenticates speakers with an authentication utterance. During authentication, one embodiment of the system receives an utterance from a speaker that it uses to both determine who the speaker claims to be, and to retrieve the enrollment utterance. The biometric analysis verifies that the speaker actually is the claimed person by analyzing the enrollment utterance against the authentication utterance.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices (e.g., cellular handsets). The program instructions can be distributed on a computer readable medium, storage volume, or the Internet. Program instructions can be in any appropriate form, such as source code, object code, or scripting code.

In the following description, for purposes of explanation, numerous specific details are set forth in order to provide a thorough understanding of the invention. The field of authentication or security is such that many different variations of the illustrated and described features of the invention are possible. Those skilled in the art will undoubtedly appreciate that the invention can be practiced without some specific details described below, and indeed will see that many other variations and embodiments of the invention can be practiced while still satisfying the teachings of the invention. Furthermore, those of skill in the art will recognize that the invention although the preferred embodiments are described with respect to a voice authentication system, that other biometric authentications are within the scope of the present invention. Accordingly, the present invention should not be understood as being limited to the specific implementations described below.

Figure 1:
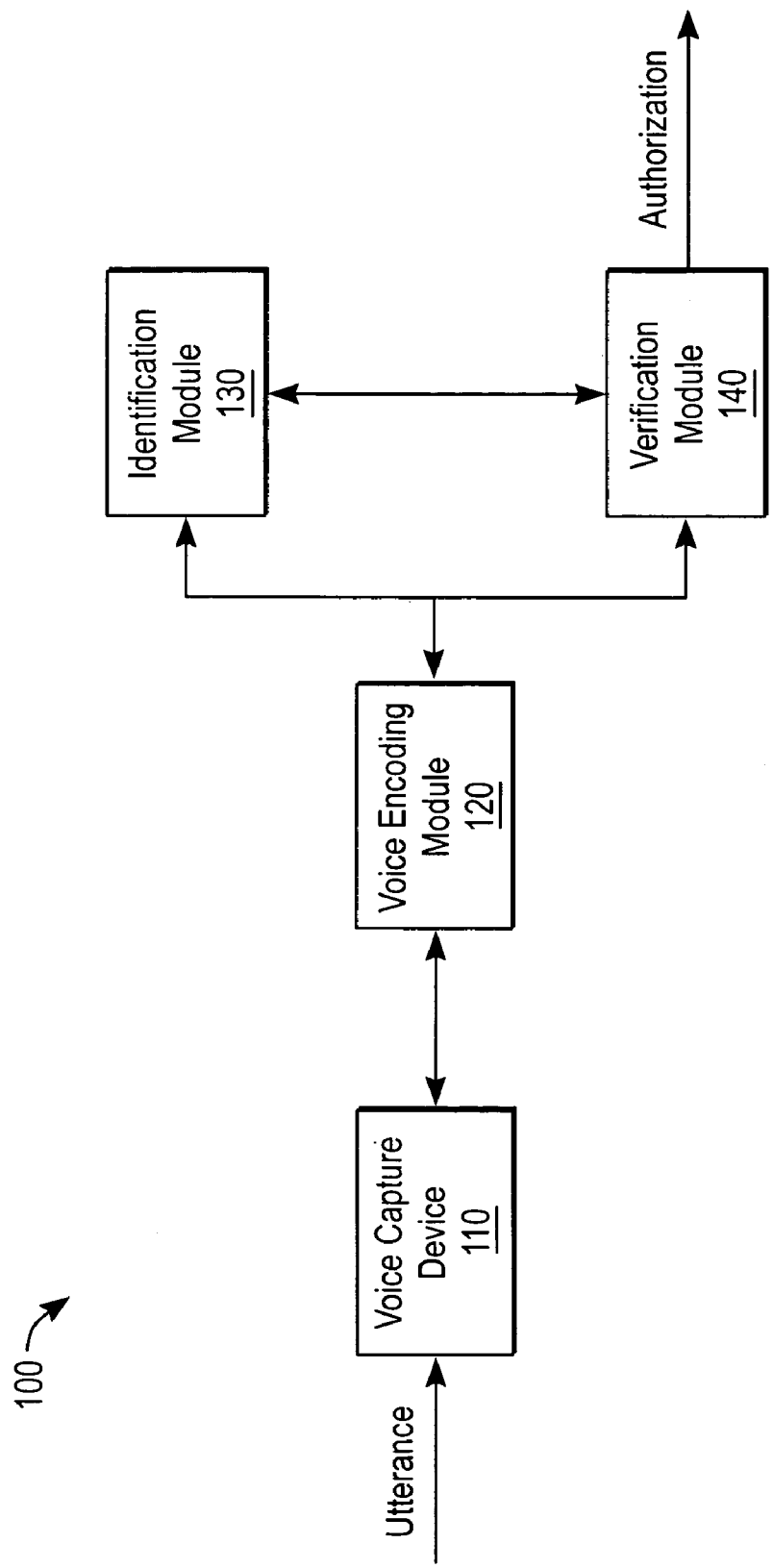
FIG. 1 is a block diagram illustrating a biometric voice authentication system according to an embodiment of the present invention.

FIG. 1 is a block diagram illustrating a biometric voice authentication system 100 according to an embodiment of the present invention. The system 100 comprises a voice capture device 110 coupled to a voice encoding module 120 which is coupled to both an identification module 130 and a verification module 140. In addition, the identification module 130 is coupled to the verification module 140. However, one of ordinary skill in the art will recognize variations of the system 100 such as modules that are indirectly or communicatively coupled (e.g., modules may communicate through APIs or a network). Additionally, modules presented herein represent groupings of functionality that may be implemented separately or together. Furthermore, modules can communicate with standards promulgated by, for example, the BioAPI Consortium.

In one embodiment, the system 100 is implemented in a general computing environment with a processor and operating system such as a PC, a laptop, a workstation, a PDA, a telephone, or other type of computer in a localized, distributed, or client/server architecture. In another embodiment, the system 100 is implemented in a specialized system used for authorization, security or other fraud prevention (e.g., ATM machines, intelligent locks, and telecommunication software), and human/computer interaction (e.g., robots). In still another embodiment, the system 100 is used in combination with a public-key infrastructure (PKI) system which uses cryptography to protect the user's biometric information. Note that a specialized voice processor, voice processing chip set, or other telephony equipment can be used to optimize the system 100 for the described applications. Also, the system 100 can be implemented in hardware and/or software.

The voice capture device 110 receives utterances from speakers and transmits an audio signal containing the utterance for analysis. As used herein, the term "utterance" refers generally to one or more words or partial words, phrases, numbers, codes, or any other vocal projection, of any language or dialect, by the speaker requesting enrollment or authentication. By contrast, the term "enrollment utterance" refers specifically to an utterance used for enrolling a speaker, and the term "authentication utterance" refers specifically to an utterance used for authenticating a speaker. The voice capture device 110 can generate an audio signal from the utterance by digitizing analog sound, receiving already digitized sound, editing the sound (e.g., clipping or audio adjusting), or otherwise preparing the sound. The voice capture device 110 comprises, for example, a cell phone, a land-line telephone, an IP telephony device, a microphone, or any other device capable of receiving utterances from the speaker. The voice capture device 110, in one embodiment, is an accessory that is unaware of the remaining system 100, and in another embodiment, is integrated and/or specially designed for the system 100. The voice capture device 110 further transmits the utterance in either analog or digital form by, for example, representative electrical or bit signals through a bus, circuit, a wire, a telephone line, or a network.

The voice encoding module 120 receives the utterance and optimizes it for identification and verification. Specifically, the voice encoding module 120 processes the utterance to compensate for differences in ambient conditions between enrollment and authentication. One embodiment of the voice encoding module 120 encodes the utterance based on the voice capture device 110, and another embodiment encodes the utterance based on its transmission channel. For example, an utterance transmitted over a cell phone will be different from the same utterance transmitted over an IP telephone due to noise and other channel and/or voice capture device characteristics. Thus, the voice encoding module 120 identifies the channel and applies a corresponding filter to generate a normalized utterance.

Another embodiment of the voice encoding module 120 processes the utterance to comply with standard audio characteristics. For example, the video encoding module 120 can clip a password portion of the utterance from extraneous sounds also captured in the utterance. Additional noise can originate from the speaker (e.g., throat clearing, additional captured words such a "uh", etc.), the environment (e.g., wind, an automobile horn, etc.), or the like. During enrollment, the voice encoding module 120 can generate a template from the enrollment utterance based on characteristics such as duration, amplitude, frequency, etc. During authentication, the voice encoding module 120 superimposes the template against the authentication utterance to remove extraneous sounds. As a result, the voice encoding module 120 reduces false negatives without reducing the level of security.

The identification module 130, during enrollment, receives an optimized enrollment utterance which it stores as a password along with identification information. During authentication, the identification module 130 receives an optimized authentication utterance and sends an associated identification for verification. To do so, the identification module 130 uses utterances as passwords or keys to associated identifications. In one embodiment, the identification module 130 segments the utterance into and stores phonemes, or language segments. In another embodiment, the identification module 130 recognizes text from the utterance. The identification can be an individual's name or other unique identifier. The identification can further include identification information such as a set of permissions, privileges, or other access rights desired by the speaker seeking authentication. The identification module 130 is described in further detail below with respect to FIG. 2.

The verification module 140, during enrollment, receives the enrollment utterance and the identification, and stores a derived voice print using the identification as an index. During authentication, the verification module 140 receives the authentication utterance, retrieves the enrollment utterance, and outputs a verification result. Because the verification module 140 operates in coordination with the identification module 130, it is able to perform biometric analysis in a quick and efficient manner suitable for deployment in many applications. As such, the verification module 140 constrains intensive biometric analysis to a particular identification without needing a separate PIN. Furthermore, the verification module 140 uses the same utterances as the identification module 130, thereby easing user complexity.

In operation, the verification module 140 extracts biometric characteristics from utterances which highlight how they are unique from other utterances. The verification module 140 can also extract statistical characteristics from utterances which highlight how they are similar to other utterances. In one embodiment, using the combination of both biometrics and statistics yields a more reliable model for speaker authentication. The verification module 140 can store the utterances themselves, or derivatives of the utterances such as a voice print or other parameters. The verification module 140 is described in further detail below with respect to FIG. 3.

Figure 2:
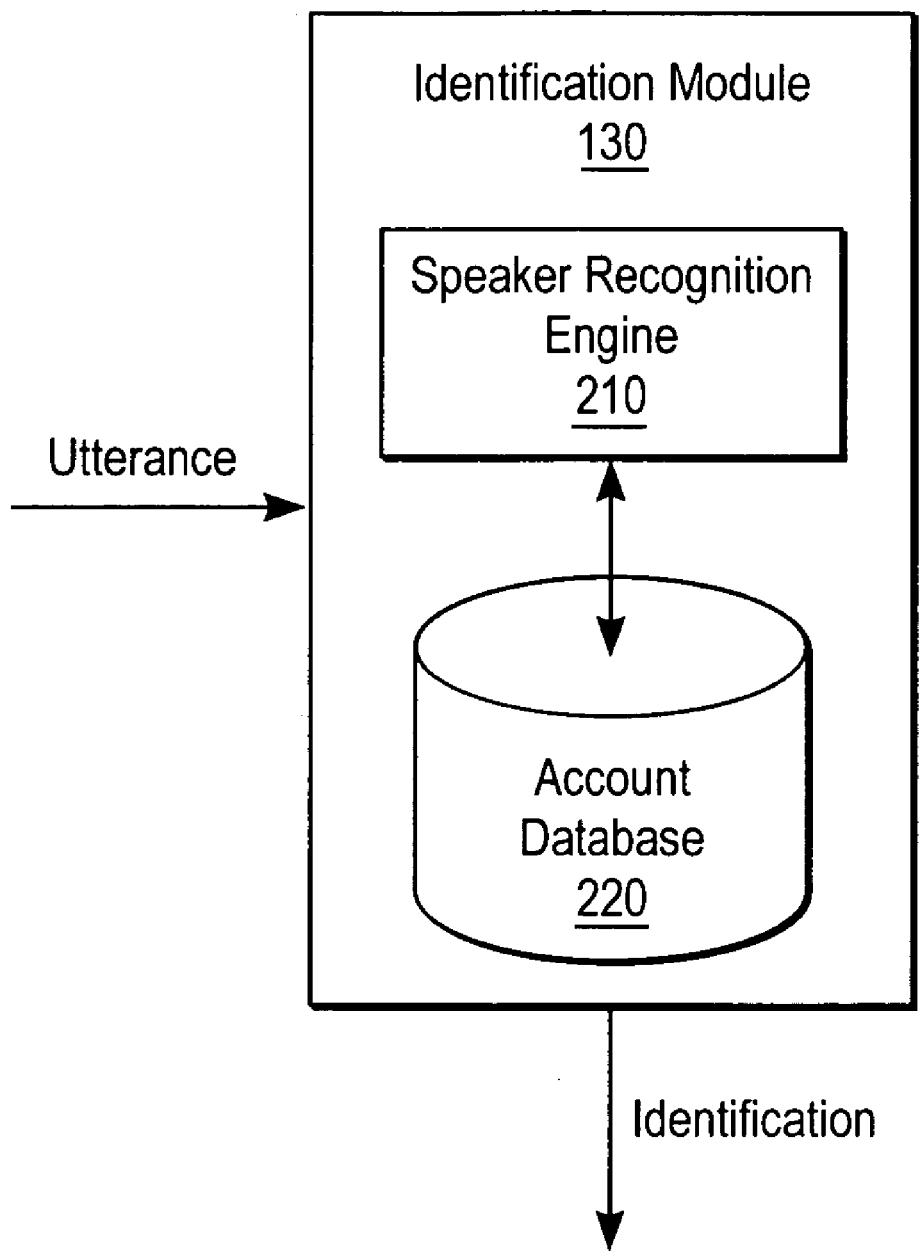
FIG. 2 is a block diagram illustrating a identification module according to an embodiment of the present invention.

FIG. 2 is a block diagram illustrating the identification module 130 according to an embodiment of the present invention. The identification module 130 comprises a speaker recognition engine 210 coupled to an account database 220. The speaker recognition engine 210, during enrollment, recognizes an utterance which it uses to store identification information as a password. During authentication, the speaker recognition engine 210 recognizes a password which it uses to search the account database 220 for the identification information.

More specifically, the speaker recognition engine 210 receives the utterance and converts it into text. The phrase "text" as used herein can refer to alphanumeric text, ASCII characters or code, binary code, or the like. In one embodiment, the speaker recognition engine 210 breaks up the utterance into phonemes units. The units can be letters, synonyms, etc. from one or more words (e.g., the phoneme from the phrase "the units" can be "theyun" and "its"). The speaker recognition engine 210 compares utterance phonemes against phenomes derived from a grammar available to the speaker recognition engine 210 with known phonetic spellings. The speaker recognition engine 210 can apply probability models and linguistic limitations to phoneme and/or text candidates for improved accuracy. The speaker recognition engine 210 comprises, for example, an optimized Dragon Naturally Speaking by ScanSoft, Inc. of Peabody, Massachusetts, an optimized interactive voice system, or any speech-to-text or voice recognition system capable of deriving text from utterances.

In one embodiment, the speaker recognition engine 210 uses blind segmentation so that it is not constrained to a specific grammar, dialect, or language. In other words, the utterances need not be converted to known text, but are instead converted to any format that can be used during both enrollment and authorization. Therefore, blind segmentation permits more flexibility in the password as it can be in any language or dialect.

The account database 220 stores a password associated with an identification. Speakers populate the account database 220 during enrollment preferably through utterances, but keyboard entries can also be used. The account database 220 associates the speaker's identity with privilege information, for example, in a tabular format. The account database 220 receives queries from the speech recognition engine 220 including indications of the utterance, and, in turn, sends the identification and/or other information to the verification module 140. The account database 220 can also include a user interface (not pictured) for data entry by the speaker or administrator. The account database 220 comprises, for example, a SQL-type database that accepts SQL-type queries and commands.

Figure 3:
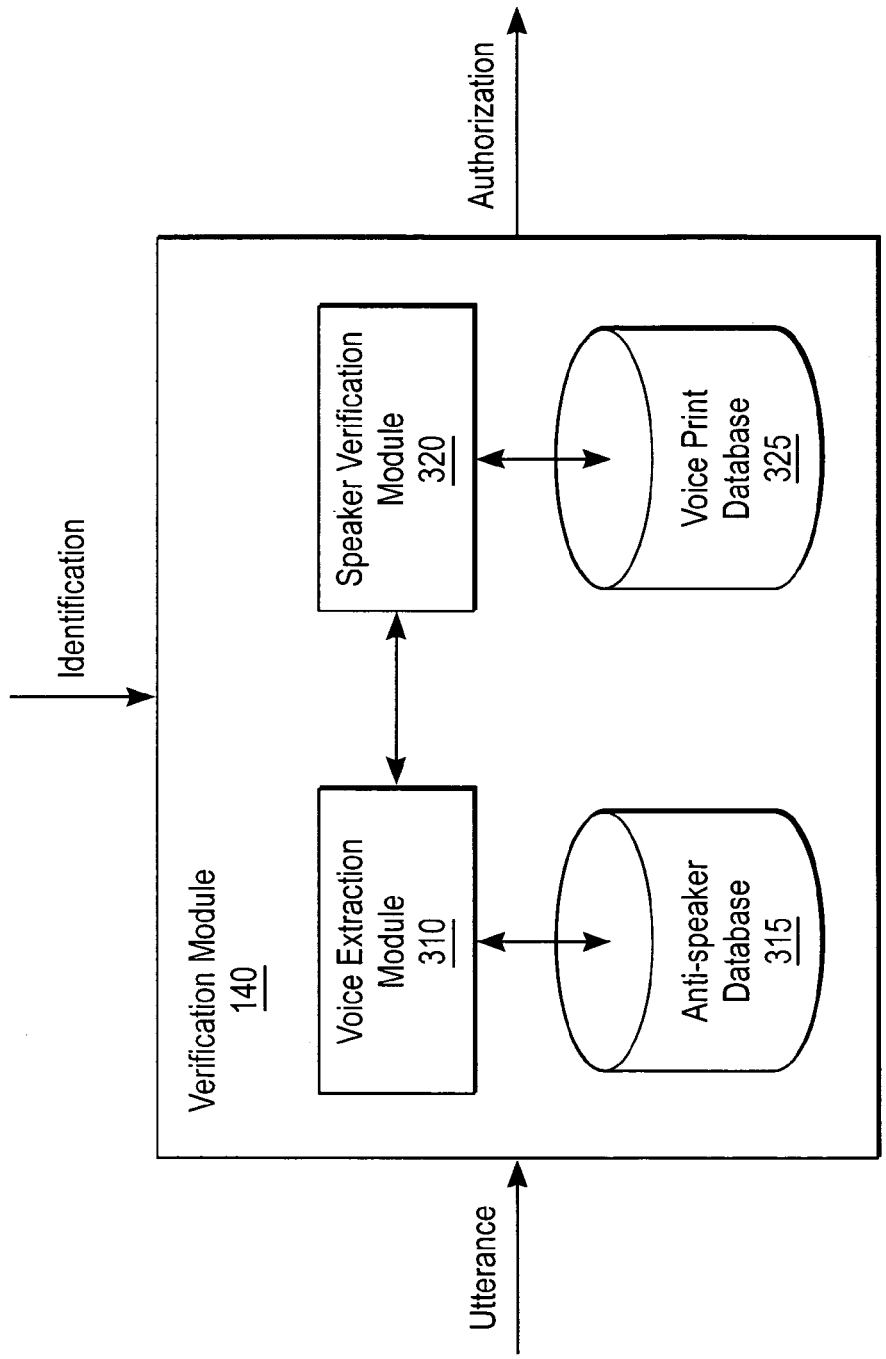
FIG. 3 is a block diagram illustrating a verification module according to an embodiment of the present invention.

FIG. 3 is a block diagram illustrating the verification module 140 according to an embodiment of the present invention. The verification module 140 comprises a voice extraction module 310 coupled to an anti-speaker database 315 and a speaker verification module 320. The speaker verification engine 320 is further coupled to a voice print database 325.

The voice extraction module 310 performs biometric analysis by, for example, using a neural tree network (NTN) to separate the common biometric aspects of the utterance from its unique biometric aspects. In one embodiment, the voice extraction module 310 generates the neural tree network during enrollment and stores a resulting data structure in the anti-speaker database 315. The voice extraction engine 310 analyses received utterances against samples in an anti-speaker database to determine which parts of the utterance are unique. One of ordinary skill in the art will recognize variations of biometric extraction within the scope of the present invention.

The speaker verification module 320 performs statistical modeling of utterance characteristics using, for example, Hidden Markov Models, Gaussian Mixed Mode (GMM), or Dynamic Time Warping (DTW). The speaker verification module 320, during enrollment, determines statistical characteristics of an enrollment utterance. During authentication, the speaker verification module 320 calculates a probability or other score representing the likelihood that an authentication voice print matches an identified enrollment voice print. One of ordinary skill in the art will recognize variations of statistical modeling that are within the present invention. The speaker verification module 320 outputs a verification result and/or other information such as, a most likely identification, privileges, accesses, etc. in response to a match. In one embodiment, the speaker verification module 320 outputs the verification if the probability is above an error threshold.

The voice print database 325 stores utterances, voice prints, and/or other audio characteristics during enrollment and searches this information during authentication. In one embodiment, the voice print database 325 stores the enrollment utterances. In another embodiment, the voice print database 325 extracts parameters and/or a voice print from one or more utterances. The voice print database 325 also associates an individual with the voice print. Additionally, the voice print database 325 can store other biometric information for verifying the individual by, for example, eye or facial scans, or fingerprinting.

Figure 4:
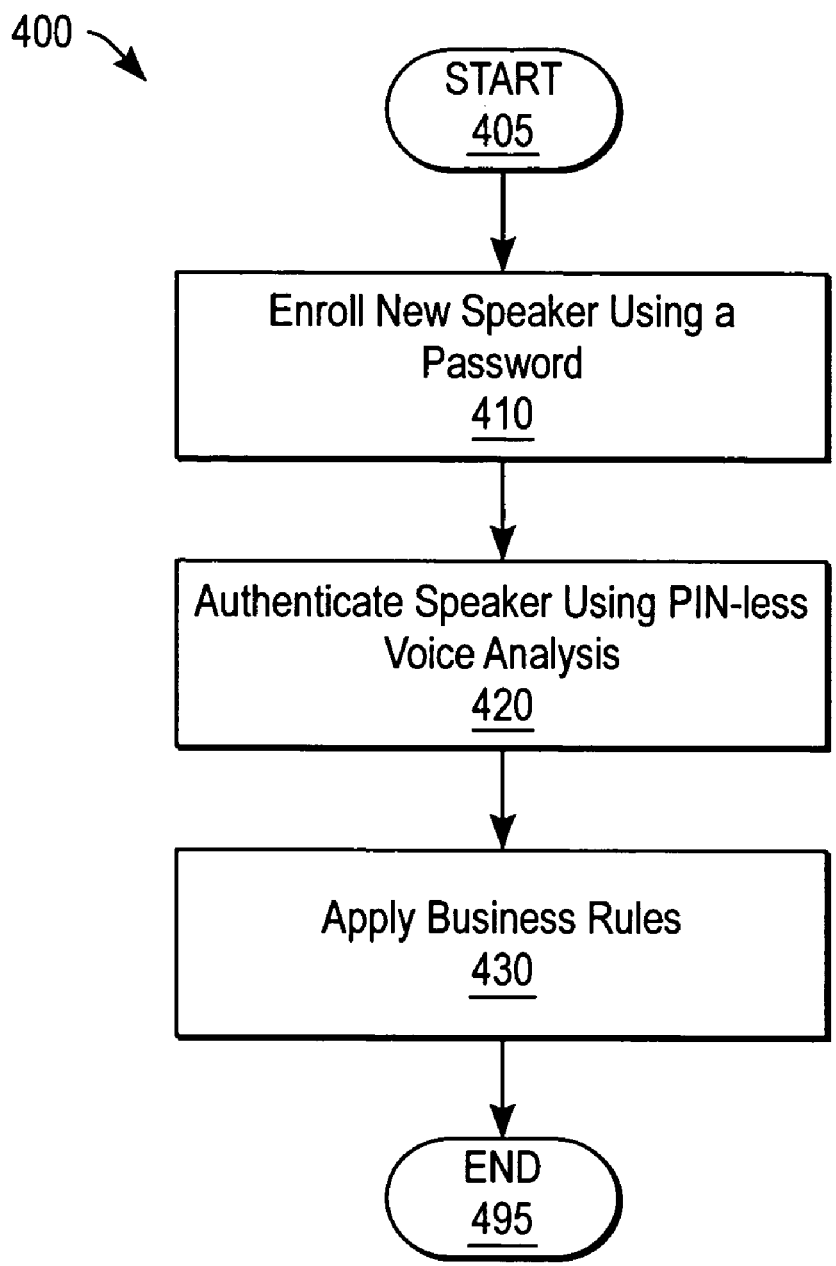
FIG. 4 is a flow chart illustrating a method of biometric voice authentication according to an embodiment of the present invention.

FIG. 4 is a flow chart illustrating a method 400 of biometric voice authentication according to an embodiment of the present invention. The system 100 first enrolls 410 a new user with a password taken from an enrollment utterance, a process herein referred to as "enrollment." More specifically, the system 100 performs biometric and statistical analyses on the speaker's voice as a reference for future utterances by the same speaker. The system 100 can continue to enroll numerous speakers before proceeding. In one embodiment, the system 100 enrolls speakers indirectly with a batch procedure of receiving data for the numerous speakers based on existing utterances without necessitating the physical presence of each speaker. The enrollment is described in further detail below with respect to FIG. 5.

The system 100 subsequently authenticates 420 a speaker using PIN-less voice analysis, a process referred to herein as "authentication." No PIN is necessary because the system 100 uses the password to retrieve biometric analysis data. The system 100 can perform the same biometric and statistical analyses from the enrollment process to match an enrollment utterance with an authentication utterance. In one embodiment, the system 100 performs additional biometric analysis using, for example, facial scans. In another embodiment, the system 100 performs biometric analysis in combination with PKI techniques. The authentication is described in further detail below with respect to FIG. 6.

Once the individual has been authenticated, the system 100 can apply 430 further business rules depending upon the deployment environment. For example, an ATM machine could permit a transaction, an automobile could unlock its doors, a robot could perform a user-customized set of actions, etc.

Figure 5:
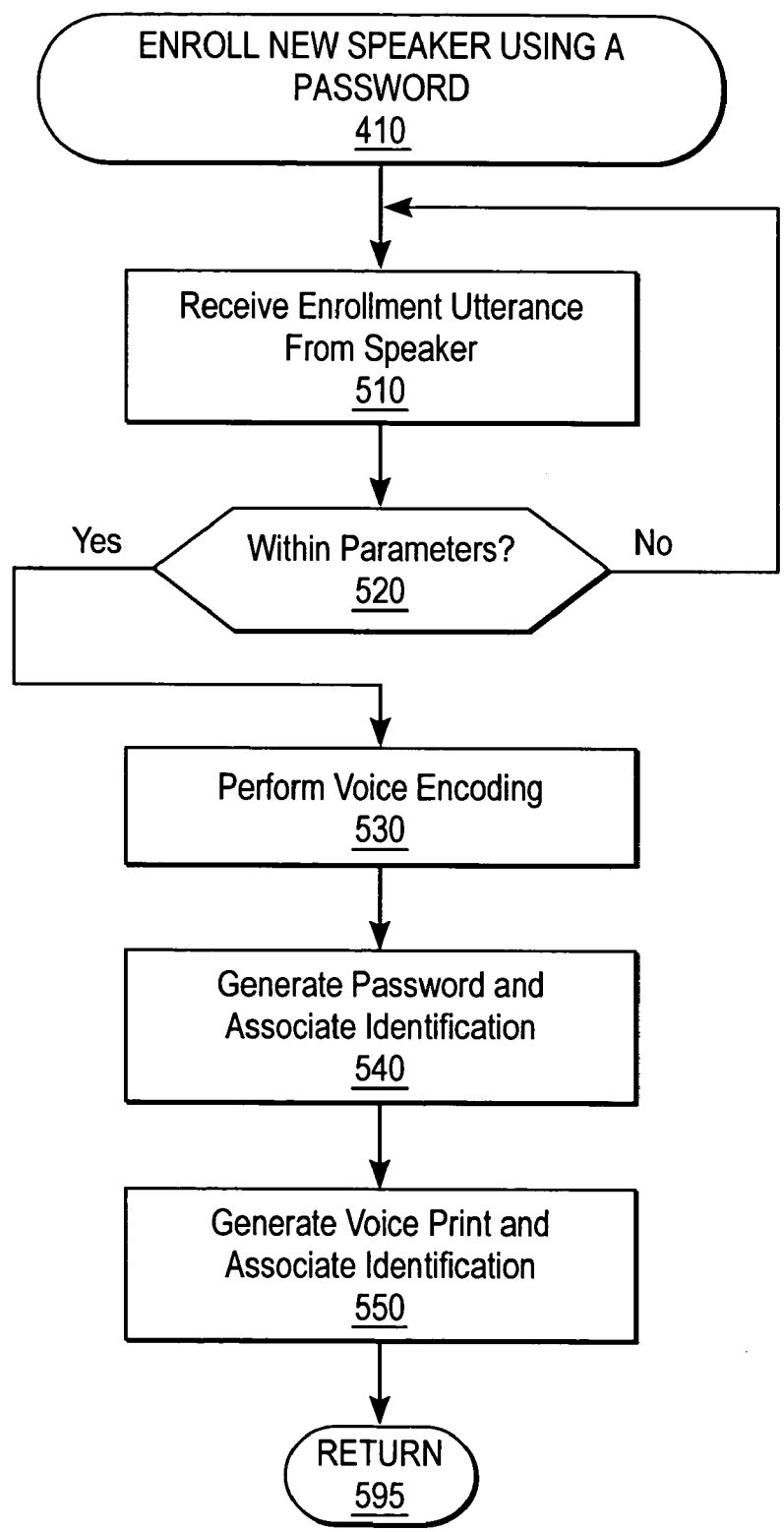
FIG. 5 is a flow chart illustrating a method of enrolling a new speaker using a password according to one embodiment of the present invention

FIG. 5 is a flow chart illustrating the method 410 of enrolling a new speaker using a password according to one embodiment of the present invention. One of ordinary skill in the art will recognize variations of the several methods presented below, and will also recognize that the processes are not temporally bound by the order in which the steps are presented.

The voice capture device 110 receives 510 an enrollment utterance from a speaker. Useable utterances preferably satisfy certain parameters that are set to ensure reliability. Parameters include, for example, an utterance length, a minimum volume or amplitude, a minimum number of synonyms, a minimum number of inflections or poles, certain frequencies, a certain length of silence beforehand and/or afterwards, and any other audio sample characteristics. The system 100 can require more than one utterance. If the parameters are not met 520, then the system 100 waits for a new utterance.

If the parameters are met 520, the voice encoding module 120 performs 530 voice encoding to prepare the utterance for analysis. In one embodiment, the voice encoding includes processing to compensate for differences in conditions such as ambient noise or channel characteristics. For example, the utterance can be filtered, wherein the filter depends on whether the voice capture device 110 is connected through a cellular network, a land-line, an IP network, etc. In another embodiment, the voice encoding includes preprocessing to standardize the utterance to certain audio characteristics. For example, the voice encoding module 120 can adjust the volume or amplitude level, clip the utterance, etc.

After encoding, the identification module 130 generates 540 a password and associates an identification with the password. The password and voice print are the unique characteristics of a speaker that will be used for authentication as described below. In one embodiment, the identification module 130 uses a speaker recognition engine 210 to generate a password represented by phenomes (e.g., using blind segmentation) and/or text from the utterance. The identification module 130 can receive the identity through a user interface as entered by the speaker or an administrator. In one embodiment, privileges or accesses are also associated with the identity. The account database 220 stores this and other information.

The verification module 140 generates 550 a voice print and associates an identity with the voice print. In one embodiment, the voice extraction module 310 generates a neural tree network comprised of the voice prints. When a new voice print is added, the verification extraction module 310 creates an exclusive node within the neural tree network based on unique aspects, and also associates the new voice print with other nodes between the exclusive node and a root node based on aspects shared with other voice prints. In one embodiment, the voice extraction module 310 employs an anti-speaker database to determine unique and common aspects. The voice extraction module 310 associates an identity with the voice print or nodes for storage in the voice print database 330. Thereafter, rather than having to use a PIN to retrieve the voice print, the password advantageously leads to the voice print.

In another embodiment of generating 550 a voice print, the speaker verification engine 320 generates a probability density function for use in a statistical analysis (e.g., Hidden Markov Models analysis). In doing so, the speaker verification engine 320 characterizes the utterances by transforming them from the time domain to the frequency domain. The speaker verification engine 320 associates an identity with a voice print or a probability density function for storage in the voice print database 330.

Figure 6:
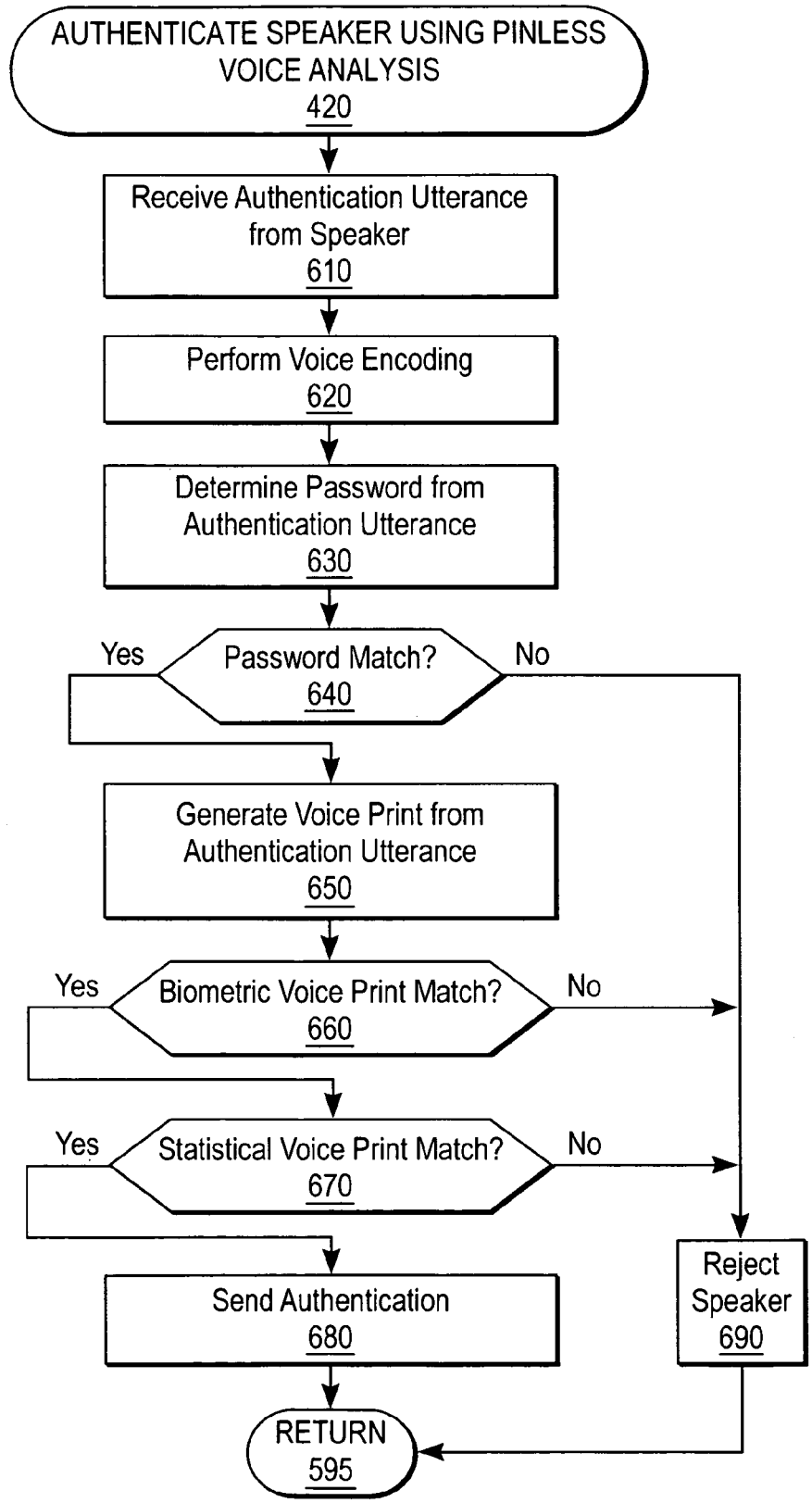
FIG. 6 is a flow chart illustrating a method of authenticating a speaker using PIN-less voice analysis according to an embodiment of the present invention.

FIG. 6 is a flow chart illustrating the method 420 of authenticating a speaker using PIN-less voice analysis according to an embodiment of the present invention. The voice capture device 110 receives 610 an authentication utterance from a speaker to determine a password. The authentication utterance can have the same parameter requirements as the enrollment utterance.

The voice encoding module 120 performs voice encoding on the authentication utterance. In one embodiment, the voice encoding performed during the authentication process is the same as the encoding performed during the enrollment process. In another embodiment, the voice encoding module 120 isolates the password by applying a voice print template to the utterance. In yet another embodiment, the voice encoding module 120 receives a password-specific template from the identification module 130 based on parameters of the identified password, and prepares the utterance for further analysis by the verification module 140. Advantageously, the verification module 140 experiences fewer false negatives by isolating the utterance.

The speaker recognition engine 210 determines 630 the password from the authentication utterance. In doing so, the speaker recognition engine 210 parses the authentication utterance into phonemes or text. Next, the speaker recognition engine 210 checks the account database 220 to determine whether the password exists among enrolled users. If there are one or more password matches 640, the identification module 130 sends an associated identity and other information to the verification module 140. In one embodiment, the identification module 130 generates scores that represent likelihoods of password matches. Identifications surpassing a password threshold are sent to the verification module 140. In still another embodiment, identification module 130 communicates information with standardized APIs.

The verification module 140 generates 650 a voice print from the authentication utterance. For comparison, the voice extraction module 310 retrieves stored enrollment voice prints from the voice print database 325 using the received identification information as an index. Next, the voice extraction module 310 determines if there is a biometric voice print match 660 using biometric characteristics of the utterance voice print and the stored voice print. In one embodiment, the voice extraction module 310 analyzes the utterance against an anti-speaker database to determine its unique aspects and retrieves just the unique aspects of the enrollment voice print from the voice print database 330.

The voice extraction module 310 compares unique aspects to determine whether there is a biometric voice print match 660. In one embodiment, the voice extraction module 310 considers scores above a biometric threshold as a match.

The speaker verification engine 320 determines whether there is a statistical voice print match 670 based on the identification information and the utterance. The speaker verification engine 320 retrieves the voice print and determines if there is a statistical match 670 using Hidden Markov Models or some other probability analysis. In one embodiment, the speaker verification engine 320 retrieves just a probability density function from the voice print database 330. In one embodiment, the speaker verification engine considers scores above a statistical threshold as a match.

In another embodiment, scores from both the voice extraction module 310 and the speaker verification engine 320 are combined to provide an overall score. In still another embodiment, the password score is combined with the biometric score and/or the statistical score to provide an overall score.

If there is an acceptable match, the verification module 140 sends 680 an authentication to auxiliary devices connected to the system 100 that, for example, apply business rules. The verification module 140 can send an identification, privileges or accesses, along with other available information for use by the auxiliary device. If there is no acceptable match, the system 100 rejects 690 the speaker. In one embodiment, the system 100 logs failed authentication attempts and can implement fraud prevention measures in response to, for example, events surrounding a certain account.

In summary, the present invention provides a practical biometric voice authentication. In one embodiment, the system 100 uses a single utterance as a password to determine who a speaker claims to be and whether the speaker is indeed the claimed person. In another embodiment, the system 100 authenticates an utterance by using a combination of biometric and statistical analysis.

The above description is included to illustrate the operation of the preferred embodiments and is not meant to limit the scope of the invention. The scope of the invention is to instead be limited only by the following claims.

We claim:

1. A voice authentication system to authenticate a speaker from an authorization utterance, comprising:
    a voice identification module to determine an identification of the speaker based on a non-biometric analysis of the authorization utterance; and
    a voice verification module coupled to the voice identification module, the voice verification module receiving the identification from the voice identification module, the voice verification module verifying the identification based on a biometric analysis of the same authorization utterance against an enrollment utterance associated with the identification, the enrollment utterance stored in the voice authentication system during enrollment of the speaker in the voice authentication system.

2. The system of claim 1, wherein the biometric analysis is independent of a PIN (Personal Identification Number).

3. The system of claim 1, wherein the biometric analysis comprises a neural network analysis.

4. The system of claim 1, wherein the voice verification module further comprises a voice extraction module to identify unique aspects of the authentication and enrollment utterances relative to common aspects of a plurality of sample utterances.

5. The system of claim 1, wherein the voice identification module determines a password based on the enrollment utterance, and stores the identification using the password as an index.

6. The system of claim 1, wherein the voice verification module converts the authentication and enrollment utterances to voice prints, and performs verification based on the voice prints.

7. The system of claim 1, wherein the voice verification module further comprises a speaker verification engine to perform a statistical analysis of the authentication utterance against the enrollment utterance.

8. The system of claim 7, the voice verification module verifies the identification based on the biometric analysis and the statistical analysis.

9. The system of claim 7, wherein the statistical analysis comprises one from the group containing: Hidden Markov Model, Gaussian Mixed Mode, Dynamic Time Warping analysis.

10. The system of claim 1, wherein the voice identification module uses the authorization utterance as an index to the identification.

11. The system of claim 1, wherein the authentication utterance and the enrollment utterance are language-independent.

12. The system of claim 1, wherein the voice identification module further comprises a speech recognition engine to perform a text-independent analysis on the authorization utterance.

13. The system of claim 1, further comprising a voice encoding module to encode the authorization utterance based on a communication channel used to transmit the authorization utterance.

14. A method of voice authentication for authenticating a speaker's identity from an authorization utterance, comprising:
    determining an identification of the speaker based on a non-biometric analysis of the authorization utterance; and
    verifying the identification of the speaker as determined by the non-biometric analysis, the verification of the identification based on a biometric analysis of the same authorization utterance against an enrollment utterance associated with the identification, the enrollment utterance stored during enrollment of the speaker for the voice authentication.

15. The method of claim 14, wherein the biometric analysis is independent of a PIN (Personal Identification Number).

16. The method of claim 14, wherein the biometric analysis comprises a neural network analysis.

17. The method of claim 14, wherein the biometric analysis comprises identifying unique aspects of the authentication and enrollment utterances relative to common aspects of a plurality of sample utterances.

18. The method of claim 14, further comprising:
    prior to determining the identification, generating a password based on the enrollment utterance; and
    storing the identification of the speaker of the enrollment utterance using the password as an index.

19. The method of claim 14, wherein the verifying the identification comprises converting the authentication and enrollment utterances to voice prints, and performs verification based on the voice prints.

20. The method of claim 14, wherein the verifying the identification further comprises performing a statistical analysis of the authentication utterance against the enrollment utterance.

21. The method of claim 20, wherein the verifying the identification comprises verifying the identification based on the biometric analysis and the statistical analysis.

22. The method of claim 20, wherein the statistical analysis comprises one from the group containing: Hidden Markov Model, Gaussian Mixed Mode, Dynamic Time Warping analysis.

23. The method of claim 14, wherein the verifying the identification further comprises performing a text-independent analysis on the authorization utterance.

24. The method of claim 23, wherein the performing the text-independent analysis comprises performing the text-independent analysis by translating the authorization utterance to text and finding matching text associated with the enrollment utterance.

25. The method of claim 14, further comprising:
    encoding the authorization utterance based on a communication channel used to transmit the authorization utterance.

26. A computer program product comprising a computer readable storage medium structured to store instructions executable by a processor in a computing device, the instructions, when executed cause the processor to:
    determine an identification of the speaker based on a non-biometric analysis of the authorization utterance; and
    verify the identification of the speaker as determined by the non-biometric analysis based on a biometric analysis of the same authorization utterance against an enrollment utterance associated with the identification, the enrollment utterance stored during enrollment of the speaker prior to the verification.

27. The computer program product of claim 26, wherein the biometric analysis is independent of a PIN (Personal Identification Number).

28. The computer program product of claim 26, wherein the biometric analysis comprises a neural network analysis.

29. The computer program product of claim 26, wherein the biometric analysis comprises identifying unique aspects of the authentication and enrollment utterances relative to common aspects of a plurality of sample utterances.

30. The computer program product of claim 26, further comprising:
    prior to determining the identification, generating a password based on the enrollment utterance; and
    storing the identification of the speaker of the enrollment utterance using the password as an index.

31. The computer program product of claim 26, wherein the verifying the identification comprises converting the authentication and enrollment utterances to voice prints, and performs verification based on the voice prints.

32. The computer program product of claim 26, wherein the verifying the identification further comprises performing a statistical analysis of the authentication utterance against the enrollment utterance.

33. The computer program product of claim 32, wherein the verifying the identification comprises verifying the identification based on the biometric analysis and the statistical analysis.

34. The computer program product of claim 26, wherein the verifying the identification further comprises performing a text-independent analysis on the authorization utterance.

35. The computer program product of claim 34, wherein the performing the text-independent analysis comprises performing the text-independent analysis by translating the authorization utterance to text and finding matching text associated with the enrollment utterance.

* * * * *